(12) United States Patent
Wood et al.

(10) Patent No.: US 9,938,931 B2
(45) Date of Patent: Apr. 10, 2018

(54) COMBINED SURFACE COOLER AND ACOUSTIC ABSORBER FOR TURBOMACHINES

(75) Inventors: Trevor Howard Wood, Clifton Park, NY (US); Todd Garrett Wetzel, Niskayuna, NY (US); Jonathan Glenn Luedke, Simpsonville, SC (US); Thomas Michael Tucker, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 2785 days.

(21) Appl. No.: 12/342,466

(22) Filed: Dec. 23, 2008

(65) Prior Publication Data

US 2010/0155016 A1 Jun. 24, 2010

(51) Int. Cl.
*B60H 1/00* (2006.01)
*F02K 1/82* (2006.01)
(Continued)

(52) U.S. Cl.
CPC .............. *F02K 1/827* (2013.01); *F01D 25/12* (2013.01); *F02C 7/045* (2013.01); *F02C 7/12* (2013.01);
(Continued)

(58) Field of Classification Search
CPC . F28F 1/10; F28F 13/00; F28F 13/003; B60H 1/18; F01N 5/00; F01N 1/082; F01P 7/023; F01P 2050/20; B64C 1/40
USPC ... 165/41, 51, 56, 80.3, 80.4, 135, 136, 181, 165/185; 415/115, 119, 211.2, 200, 178, 415/191, 177, 198.1; 181/213, 293; 29/889.2
See application file for complete search history.

(56) References Cited

U.S. PATENT DOCUMENTS 3,116,613 A 1/1964 Evelyn et al.
3,542,152 A * 11/1970 Oxx, Jr. et al. ............... 181/214
(Continued)

FOREIGN PATENT DOCUMENTS

DE 10034301 A1 1/2002
EP 1591643 A1 11/2005
(Continued)

OTHER PUBLICATIONS

Wassim Elias Azzi; "A Systematic Study on the Mechanical and Thermal Properties of Open Cell Metal Foams for Aerospace Applications"; A thesis submitted to the Graduate Faculty of North Carolina State University in partial fulfillment of the requirements for the Degree of Master of Science; 125pages.
(Continued)

*Primary Examiner* — Travis Ruby
(74) *Attorney, Agent, or Firm* — John P. Darling

(57) ABSTRACT

A surface cooler for turbomachines includes an inner layer and an outer layer disposed adjacent to the inner layer and including a metal foam, a carbon foam, or a combination thereof, wherein the metal foam, the carbon foam or a combination thereof is configured to augment heat transfer and enhance acoustic absorption. Further, the outer layer includes a plurality of fins, wherein the plurality of fins are configured to augment heat transfer and enhance acoustic absorption, and wherein the plurality of fins includes metal foam, a carbon foam, or a combination thereof.

24 Claims, 8 Drawing Sheets

(51) Int. Cl.
*F01D 25/12* (2006.01)
*F02C 7/045* (2006.01)
*F02C 7/12* (2006.01)

(52) U.S. Cl.
CPC .. *F05D 2300/224* (2013.01); *F05D 2300/612* (2013.01); *Y02T 50/675* (2013.01); *Y10T 29/4935* (2015.01)

(56) References Cited

U.S. PATENT DOCUMENTS

| | | | |
|---|---|---|---|
| 4,759,000 | A | 7/1988 | Reitz |
| 5,782,082 | A | 7/1998 | Hogeboom et al. |
| 6,390,181 | B1 * | 5/2002 | Hall et al. .................... 165/80.3 |
| 6,652,222 | B1 | 11/2003 | Wojtyczka et al. |
| 6,827,556 | B2 | 12/2004 | Simon |
| 6,894,790 | B2 | 5/2005 | Mitsui et al. |
| 7,105,127 | B2 | 9/2006 | Vatchiants |
| 7,189,064 | B2 | 3/2007 | Helder et al. |
| 2005/0111966 | A1 | 5/2005 | Metheny |
| 2005/0249602 | A1 | 11/2005 | Freling et al. |

FOREIGN PATENT DOCUMENTS

| | | | |
|---|---|---|---|
| GB | 2418460 | A | 3/2006 |
| JP | S61258999 | A | 11/1986 |
| JP | 04324030 | A | 11/1992 |
| JP | 2002242886 | A | 8/2002 |
| JP | 2002364593 | A | 12/2002 |
| JP | 2003184767 | A | 7/2003 |
| JP | 2004508478 | A | 3/2004 |
| JP | 2005325839 | A | 11/2005 |
| JP | 2005350341 | A | 12/2005 |
| JP | 2005537424 | A | 12/2005 |
| JP | 2009001880 | A | 1/2009 |
| WO | 2001053023 | A1 | 7/2001 |
| WO | 2003106263 | A1 | 12/2003 |

OTHER PUBLICATIONS

Pontus Nordin, Sohan L. Sarin and Edward R. Rademaker; "Development of New Liner Technology for Application in Hot Stream Areas of Aero-Engines"; 2004 by Saab AB. Published by the American Institute of Aeronautics and Astronautics, Inc., with permission; 13pages.
Search Report and Written Opinion from corresponding EP Application No. 09179366.1-1610 dated May 16, 2013.
Kirca et al., Computational modeling of micro-cellular carbon foams, Finite Elements in Analysis and Design, Elsevier, Amsterdam, NL, vol. 44, No. 1-2, pp. 45-52, Oct. 17, 2007.
Unofficial English translation of a JP Office Action dated Feb. 12, 2014 issued in connection with corresponding JP Application No. 2010-076539.
Unofficial English translation of Office Action issued in connection with corresponding JP Application No. 2009-288556 dated Oct. 29, 2013.
European Search Report and Written Opinion issued in connection with corresponding EP Application No. 10157783.1-1610 dated Jun. 5, 2014.

* cited by examiner

COMBINED SURFACE COOLER AND ACOUSTIC ABSORBER FOR TURBOMACHINES

BACKGROUND

The invention relates generally to turbomachines, and more particularly to the design of enhanced surface coolers for use in the turbomachines.

Aircraft gas turbine engine manufacturers are developing new ways of effectively reducing noise. As will be appreciated, nacelles on jet engines currently utilize liners or acoustic panels to absorb sound produced by the blades and vanes or other turbomachinery elements in the turbofan. These panels are typically located on the nacelle walls. Additionally, it is desirable to place heat sinks in similar locations for removing heat from oil, water, and other coolants. Unfortunately, these heat sinks occupy space that may otherwise be used to house acoustic panels or other materials for further acoustic absorption.

Currently available techniques typically use separate heat exchangers and acoustic absorbers to address the cooling and noise reduction needs of the turbomachines. For example, brick style heat exchangers are used to facilitate heat removal from the engines. However, these brick style heat exchangers may not be effective when the heat load is high. Further, more recent techniques employ surface coolers embedded in an outer wall of a bypass duct spanning the entire circumference of an engine, thereby reducing the amount of surface area available for an acoustic liner.

It may therefore be desirable to develop surface coolers that may be used for acoustic absorption as well as for heat exchange. More particularly, it may be desirable to develop robust surface coolers configured to enhance acoustic absorption while also facilitating efficient cooling.

BRIEF DESCRIPTION

Briefly in accordance with one aspect of the present technique a surface cooler is provided. The surface cooler comprises an inner layer and an outer layer disposed adjacent to the inner layer and comprising a metal foam, a carbon foam, or a combination thereof, wherein the metal foam, the carbon foam or a combination thereof is configured to augment heat transfer and enhance acoustic absorption.

In accordance with another aspect of the present technique a surface cooler is provided. The surface cooler comprises an inner layer and an outer layer disposed adjacent to the inner layer and comprising a plurality of fins, wherein the plurality of fins is configured to augment heat transfer and enhance acoustic absorption, and wherein the plurality of fins comprises metal foam, a carbon foam, or a combination thereof.

In accordance with yet another aspect of the present technique a method of forming a surface cooler is provided. The method provides for forming an inner layer and forming an outer layer adjacent to the inner layer, wherein the outer layer comprises a metal foam, a carbon foam, or a combination thereof, and wherein the metal foam, the carbon foam, or a combination thereof is configured to augment heat transfer and enhance acoustic absorption.

In accordance with a further aspect of the present technique an engine is provided. The engine comprises a core engine and a surface cooler comprising an inner layer and an outer layer disposed adjacent to the inner layer and comprising a metal foam, a carbon foam, or a combination thereof, wherein the metal foam, the carbon foam or a combination thereof is configured to augment heat transfer and enhance acoustic absorption.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention relate to surface coolers and more particularly to enhanced surface coolers for use in a nacelle of an engine such as an aircraft engine. The exemplary surface coolers may also be utilized in acoustic absorption as well as for providing efficient cooling. Further, the term "surface coolers" as used herein, may be used interchangeably with the term "heat exchangers." As used herein, the surface coolers are applicable to various types of turbomachinery applications such as, but not limited to, turbojets, turbofans, turbo propulsion engines, aircraft engines, gas turbines, steam turbines, wind turbines, and water turbines.

Figure 1:
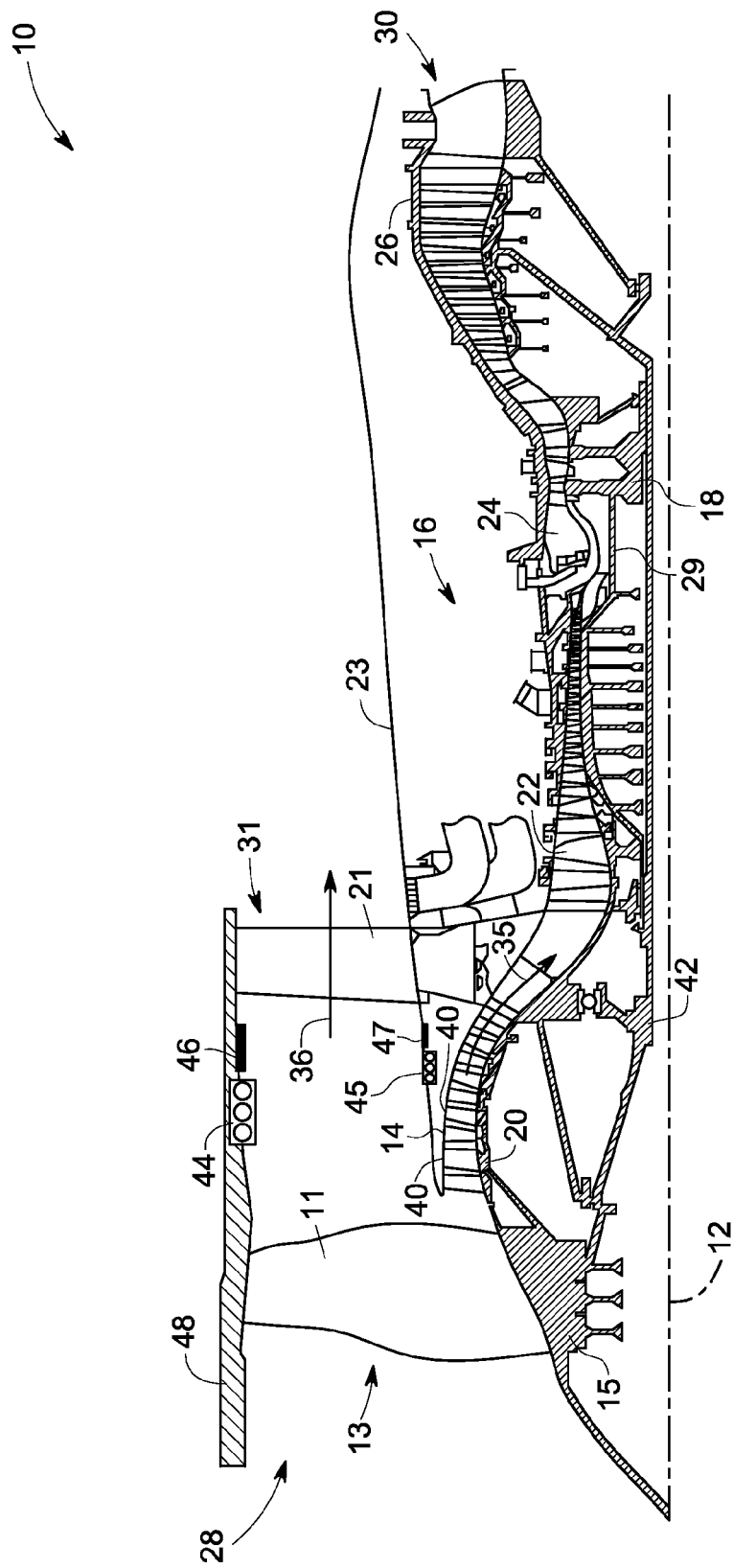
FIG. 1 is a diagrammatic illustration of an engine, in accordance with the aspects of the present technique.

FIG. 1 is a schematic illustration of an exemplary aircraft engine assembly 10 in accordance with the present invention. Reference numeral 12 may be representative of a centerline axis 12. In the exemplary embodiment, the engine assembly 10 includes a fan assembly 13, a booster compressor 14, a core gas turbine engine 16, and a low-pressure turbine 26 that may be coupled to the fan assembly 13 and the booster compressor 14. The fan assembly 13 includes a plurality of rotor fan blades 11 that extend substantially radially outward from a fan rotor disk 15, as well as a plurality of outlet guide vanes 21 that may be positioned downstream of the fan blades 11. The core gas turbine engine 16 includes a high-pressure compressor 22, a combustor 24, and a high-pressure turbine 18. The booster compressor 14 includes a plurality of rotor blades 40 that extend substantially radially outward from a compressor rotor disk 20 coupled to a first drive shaft 42. The compressor 22 and the high-pressure turbine 18 are coupled together by a second drive shaft 29. The engine assembly 10 also includes an intake side 28, a core engine exhaust side 30, and a fan exhaust side 31.

During operation, the fan assembly 13 compresses air entering the engine 10 through the intake side 28. The airflow exiting the fan assembly 13 is split such that a portion 35 of the airflow is channeled into the booster compressor 14 and a remaining portion 36 of the airflow bypasses the booster compressor 14 and the core turbine engine 16 and exits the engine 10 through the fan exhaust side 31. This bypass air 36 flows past and interacts with the outlet guide vanes 21 creating unsteady pressures on the stator surfaces as well as in the surrounding airflow that radiate as acoustic waves. Acoustic liner 46 may be configured to absorb sound produced by the blades and the vanes 21 in the engine 10. A plurality of rotor blades 40 compress and deliver the compressed airflow 35 towards the core gas turbine engine 16. Furthermore, the airflow 35 is further compressed by the high-pressure compressor 22 and is delivered to the combustor 24. Moreover, the compressed airflow 35 from the combustor 24 drives the rotating turbines 18 and 26 and exits the engine 10 through the exhaust side 30.

As previously noted, in certain presently available commercial engines, separate heat exchangers and acoustic absorbers are employed. Furthermore, high heat loads may lead to sub-optimal performance of certain heat exchangers. In addition, use of certain other heat exchangers leads to dramatic reduction in surface area available for the acoustic absorber. In accordance with exemplary aspects of the present technique, a combined device 44 configured to function as a surface cooler and acoustic absorber is presented. More particularly, the exemplary combined device 44 may be configured to simultaneously address the heat exchange requirements and acoustic absorption needs of a turbomachine such as an aircraft engine, for example. Hereinafter, the term "surface cooler" may be used to refer to the combined device 44 configured to facilitate cooling and acoustic absorption.

According to aspects of the present technique, the exemplary surface cooler 44 may comprise a metal foam. In an alternate embodiment, the surface cooler may comprise a carbon foam. It may be noted that the exemplary surface cooler may include foams having high thermal conductivity, in certain other embodiments. By way of example, foams may include carbon foams having thermal conductivity in the range from about 150 W/m*K to about 390 W/m*K. In another embodiment, a metal foam may include an aluminum foam with a thermal conductivity of about 189 W/m*K. As will be appreciated, a metal foam is a cellular structure consisting of a solid metal where a large volume fraction includes gas-filled pores. The pores may be sealed (closed-cell foam), or they may form an interconnected network (open-cell foam). Typically, these metal foams have a very high porosity. In other words typically 75-95% of the volume consists of void spaces. It may be noted, that the thermal conductivity of metal foam may vary greatly, depending not only on the porosity, but also on finer details of the integrity of the webs that interconnect various cells in a foam.

According to embodiments of the present technique, the exemplary surface cooler 44 may be disposed alongside a nacelle wall or an outer wall 48 to facilitate heat transfer, as well as provide acoustic absorption according to embodiments of the present invention and will be described in greater detail hereinafter.

In alternate embodiment, FIG. 1 also illustrates a surface cooler 45 and an acoustic liner 47 that may be placed along an inner wall 23 of the bypass flow 36 connecting the bottom of outlet guide vane 21.

Figure 2:
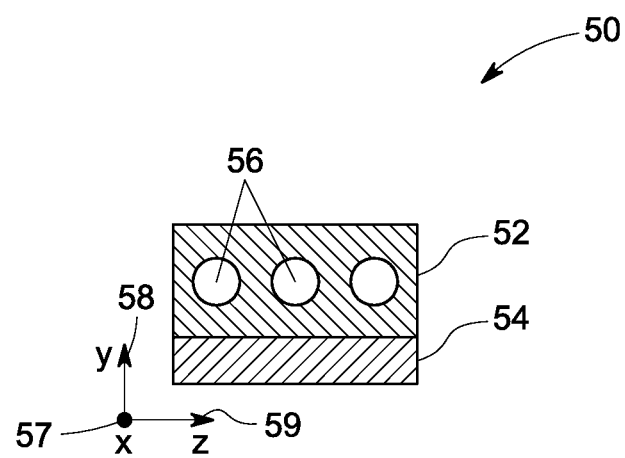
FIG. 2 is a diagrammatic illustration of a circumferential cross-section of an exemplary surface cooler, in accordance with aspects of the present technique.

Referring now to FIG. 2, a diagrammatic illustration of an axial cross-section of an exemplary surface cooler 50 in accordance with one aspect of the present invention is depicted. As illustrated in FIG. 2, the surface cooler 50 includes an inner layer 52 and an outer layer 54. In accordance with aspects of the present technique, the inner layer 52 may be formed of a metallic plate. It may be noted that according to the aspects of the present technique, the inner layer 52 may be disposed alongside the nacelle wall or the outer wall 48 (see FIG. 1). Further, the outer layer 54 may include material such as, but not limited to, a metal foam, a carbon foam, or a combination thereof. Alternatively, the inner layer 52 may include a metal foam having high thermal conductivity. As previously noted, a metal foam is a cellular structure consisting of a solid metal where a large volume fraction includes gas-filled pores. By way of example, the thickness of the inner layer 52 may vary in a range from about 0.5 inch to about 0.75 inch. Moreover, the thickness of the outer layer 54 may vary in the range from about 0.5 inch to about 1.0 inch.

In accordance with aspects of present technique, the metal foams are used to augment heat transfer in addition to providing noise reduction. Specifically, the metal foams may be employed to augment heat transfer/cooling as the metal foams provide a good combination of enhanced thermal conduction, with a large surface area for convection, while also having a comparatively low mass. In addition, the porous metal foam may also be configured to absorb noise generated by various parts in the engine 10. In other words, the metal foam of the inner layer 52 may be configured to facilitate reduction of noise in the engine 10 by absorbing the noise in the engine 10. Consequently, the metal foam may be configured to provide means to facilitate heat exchange and acoustic attenuation in one low-mass package.

Further, as illustrated, at least one and typically a plurality of tubes 56 may be disposed in the inner layer 52 of the exemplary surface cooler 50. In one embodiment, the plurality of tubes 56 may be embedded in the inner layer. The plurality of tubes 56 may be configured to aid in cooling a fluid that may be heated by various parts of the engine. As will be appreciated, a fluid such as oil may be heated by parts of the engine such as bearings. This heated fluid (oil) may be channeled through the surface cooler 50 via the tubes 56. The heat from the fluid may be transferred from the walls of the tubes 56 and dissipated into the airflow via the surface cooler 50. This fluid may then be carried back to the parts in engine 10. In one embodiment the dimensions of tubes may be about 0.5 inch in diameter. More particularly, the dimensions of the tubes may typically be less than the thickness of the inner layer 52. The plurality of tubes 56 may be made of material such as, but not limited to, aluminum. In one embodiment, the fluid may include oil or water.

With continuing reference to FIG. 2, reference numeral 57 is generally representative of a x-direction, while a y-direction is represented by reference numeral 58. Also, reference numeral 59 is representative of a z-direction. It may be noted that the airflow is in the z-direction 59.

By implementing the exemplary surface cooler 50 including a metal foam as described hereinabove, an increase in the heat rejected per unit mass of the surface cooler 50 may be obtained. Additionally, use of the metal foam in the surface cooler 50 may also facilitate noise reduction from the bypass flow turbomachinery elements.

Figure 3:
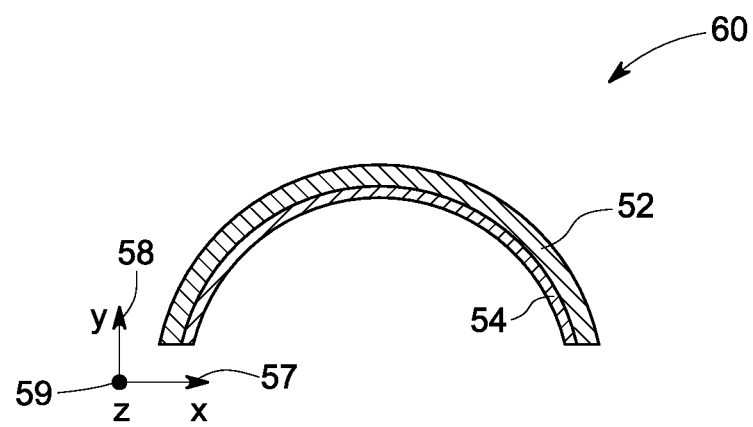
FIG. 3 is an axial cross-section view of the surface cooler of FIG. 2, in accordance with aspects of the present technique.

FIG. 3 illustrates circumferential cross-section 60 of the exemplary surface cooler 50 of FIG. 2. As noted above, the surface cooler 50 includes the inner layer 52 and the outer layer 54. The inner layer 52 of the surface cooler 50 is disposed alongside the nacelle wall or the outer wall 48 (see FIG. 1) of the turbo engine 10 (see FIG. 1). It may be noted that the airflow is in the z-direction 59.

Figure 4:
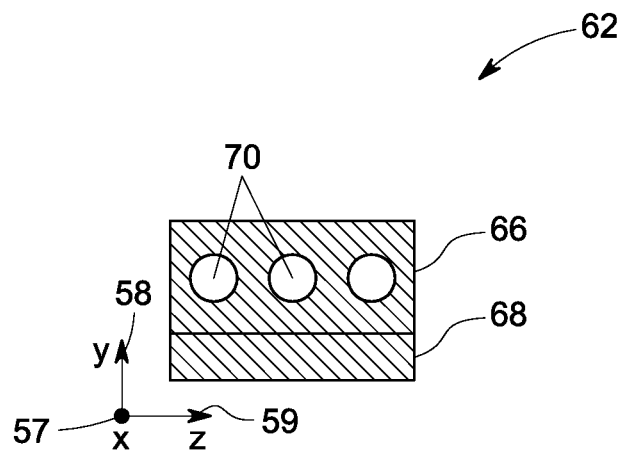
FIG. 4 is a diagrammatical illustration of a circumferential cross-section of another surface cooler, in accordance with aspects of the present technique.

Turning now to FIG. 4, an axial cross-section of another embodiment of a surface cooler 62 in accordance with the present invention is illustrated. The surface cooler 62 includes an inner layer 66 and an outer layer 68. In the present embodiment, the inner layer 66 and the outer layer 68 may include metal foams, carbon foams or a combination thereof. In one embodiment, both the inner layer 66 and the outer layer 68 may include substantially similar materials. In other words, the inner and the outer layer 66, 68 may include a metal foam, a carbon foam, or a combination thereof. Alternatively, the inner layer 66 and the outer layer 68 may include metal foams having different densities and/or porosities. By way of example, the inner layer 66 may include a metal foam having a first density, while the outer layer 68 may include a metal foam having a second density, where the second density is different from the first density. This may aid in increasing the heat transfer capacity of the surface cooler 62. Further, the use of metal foams having different porosities and/or densities in the inner and outer layer 66, 68 may enhance the noise attenuation capability of the surface cooler 62. In accordance with further aspects of the present technique, porosity of the metal foam may be varied. More particularly, the porosity of the metal foam may be intentionally varied to achieve different length scales to facilitate absorption of different acoustic wavelengths. Further, as illustrated in FIG. 4, a plurality of tubes 70 may be disposed in the inner layer 66, where the plurality of tubes 70 may be configured to aid in cooling a fluid that may be heated by various parts of the engine 10. It may be noted that the airflow is in the z-direction 59.

Figure 5:
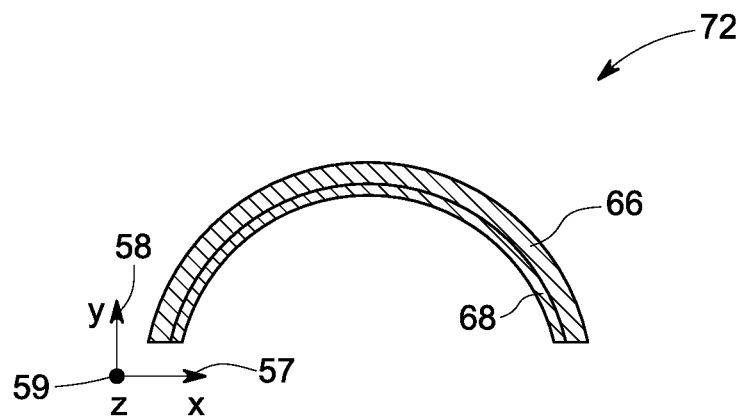
FIG. 5 is an axial cross-section view of the surface cooler of FIG. 4, in accordance with aspects of the present technique.

FIG. 5 illustrates a circumferential cross-section 72 of the exemplary surface cooler 62 of FIG. 4. As noted previously, the inner layer 66 of the surface cooler may be disposed alongside the nacelle wall or the outer wall 48 (see FIG. 1) of the engine 10 (see FIG. 1). Here again, the airflow is in the z-direction 59.

Figure 6:
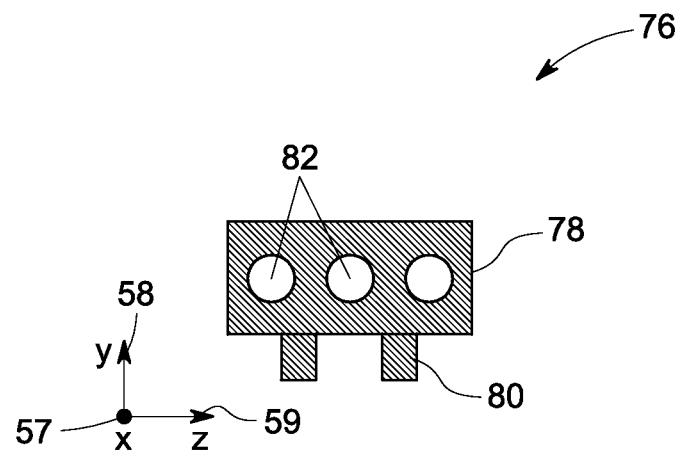
FIG. 6 is a diagrammatical illustration of a circumferential cross-section of yet another surface cooler, in accordance with aspects of the present technique.

Furthermore, FIG. 6 illustrates an axial cross-section of yet another embodiment of a surface cooler 76, in accordance with aspects of the present technique. As depicted in FIG. 6, the surface cooler 76 includes an inner layer 78. In accordance with the aspects of the present technique, the inner layer 78 may include metal foam, carbon foam, or a combination thereof. Further, in one embodiment the inner layer 78 may include a solid material. Moreover, a plurality of fins 80 may be disposed adjacent to the inner layer 78. In one embodiment, the plurality of fins 80 may also include a metal foam. More particularly, the metal foam may be formed and/or machined into the plurality of discrete fins 80. These fins 80 may be oriented parallel to a main airflow, such as the airflow 36 (see FIG. 1) in one embodiment. Alternatively, it may be noted that the fins 80 are oriented to be substantially parallel to the main airflow. It may be noted that the airflow is in the z-direction 59

By implementing the foam fins 80 to protrude into the main airflow, the area of heat transfer may be increased thereby augmenting heat transfer. Moreover, the increased surface area of the fins 80 may aid in enhancing acoustic absorption. In addition to forming the plurality of foam fins 80, the metal foam may also be machined and/or formed into pins and/or other structures configured to efficiently increase heat transfer. Additionally, a plurality of tubes 82 may be disposed in the inner layer 76, where the tubes 82 are configured to channel a fluid to the surface cooler, thereby enabling aid in cooling a fluid that is heated by various parts in the engine 10.

Figure 7:
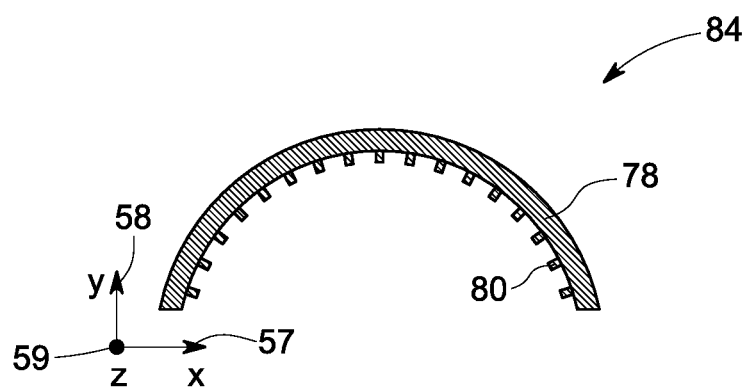
FIG. 7 is an axial cross-section view of the surface cooler of FIG. 6, in accordance with aspects of the present technique.

FIG. 7 illustrates a circumferential cross-section 84 of the exemplary surface cooler 76 of FIG. 6. As noted previously, the inner layer 78 of the surface cooler may be disposed alongside the outer wall 48 (see FIG. 1) of the engine 10 (see FIG. 1). Here again, the direction of airflow is in the z-direction 59.

Figure 8:
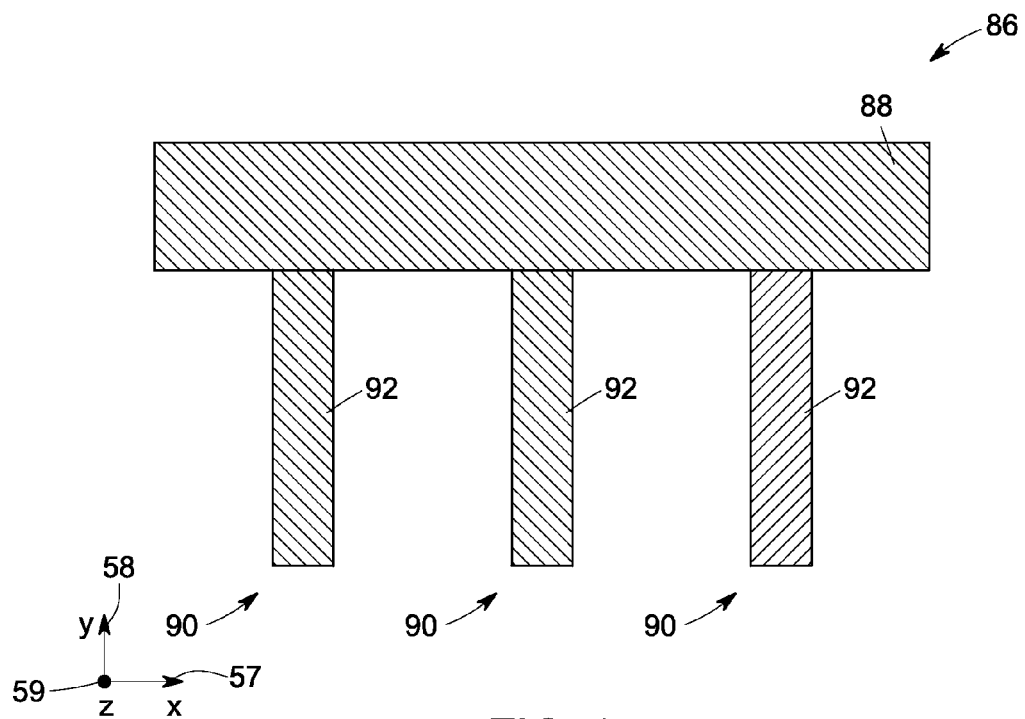
FIG. 8 is a diagrammatical illustration of a portion of the surface cooler of FIG. 7, in accordance with aspects of the present technique.

Referring now to FIG. 8 a portion 86 of an exemplary surface cooler 76 of FIG. 6 is illustrated. Reference numeral 88 is indicative of an inner layer. A plurality of fins 90 are disposed adjacent to the inner layer 88. Further, the inner layer 88 and the fins 90 may be formed from metal foam or carbon foam 92. Moreover, the inner layer 88 may also be formed from a solid material.

Figure 9:
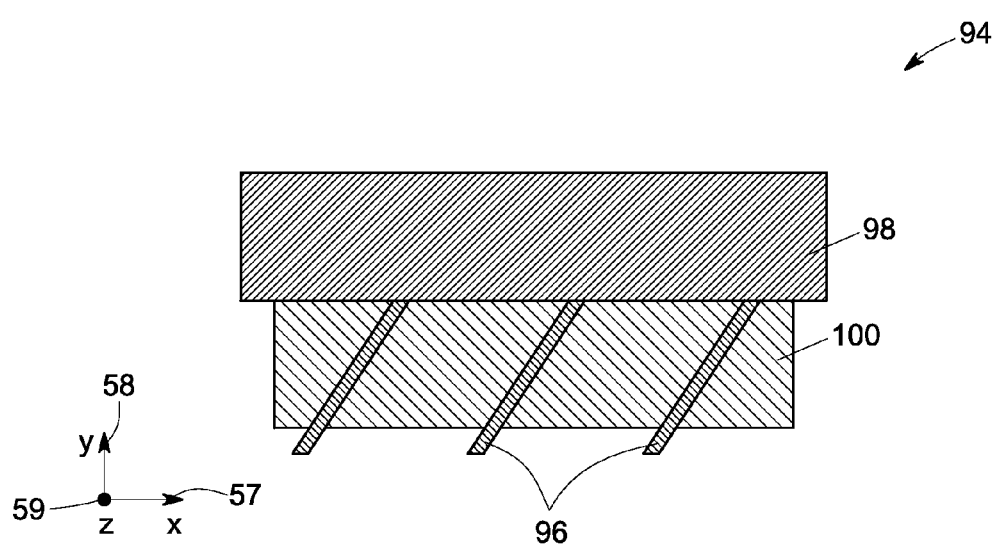
FIG. 9 is a diagrammatical illustration depicting a portion of another exemplary surface cooler, in accordance with aspects of the present technique.

FIG. 9 illustrates another embodiment of the present invention, where a portion of a surface cooler 94 including a plurality of fins 96 is depicted. In the illustrated embodiment, an inner layer 98 of the exemplary surface cooler 94 may include a solid metal. Moreover, the plurality of fins 96 may also be formed of a material, such as, but not limited to, a solid metal. In the illustrated embodiment, the plurality of fins 96 protrude from a base of the inner layer 98 and may include a material used to form the inner layer 98. Alternatively, in another embodiment, a material such as, but not limited to, aluminum may be used to form the inner layer 98 and the plurality of fins 96. In accordance with the present embodiment, space between the plurality of fins 96 may be filled with a carbon foam or a metal foam 100. The carbon foam or the metal foam 100 may be molded or injected around the plurality of fins 96. More particularly, the carbon or metal foam 100 may be molded or injected around the fins 96 such that the fins 96 protrude beyond the carbon foam or the metal foam 100. In one embodiment, the plurality of fins 96 may be inclined at an angle of about 70 degrees relative to the inner layer 98. In accordance with some embodiments of the present technique, the depth to which carbon or metal foam 100 may be injected relative to the top of the fins 96 may be dependent on several factors, such as, but not limited to, thermal conductivity of the metal and the foam, acoustic characteristics of the foam, spacing of the fins 96 and so forth. In accordance with further aspects of the present technique, porosity of the metal foam may be varied. More particularly, the porosity of the metal foam may be intentionally varied between different length scales to facilitate absorption of different acoustic wavelengths. Moreover, the fins may be arranged in such a way so as to minimize turbomachinery interaction noise by acoustic cancellation of dominant tones.

Figure 10:
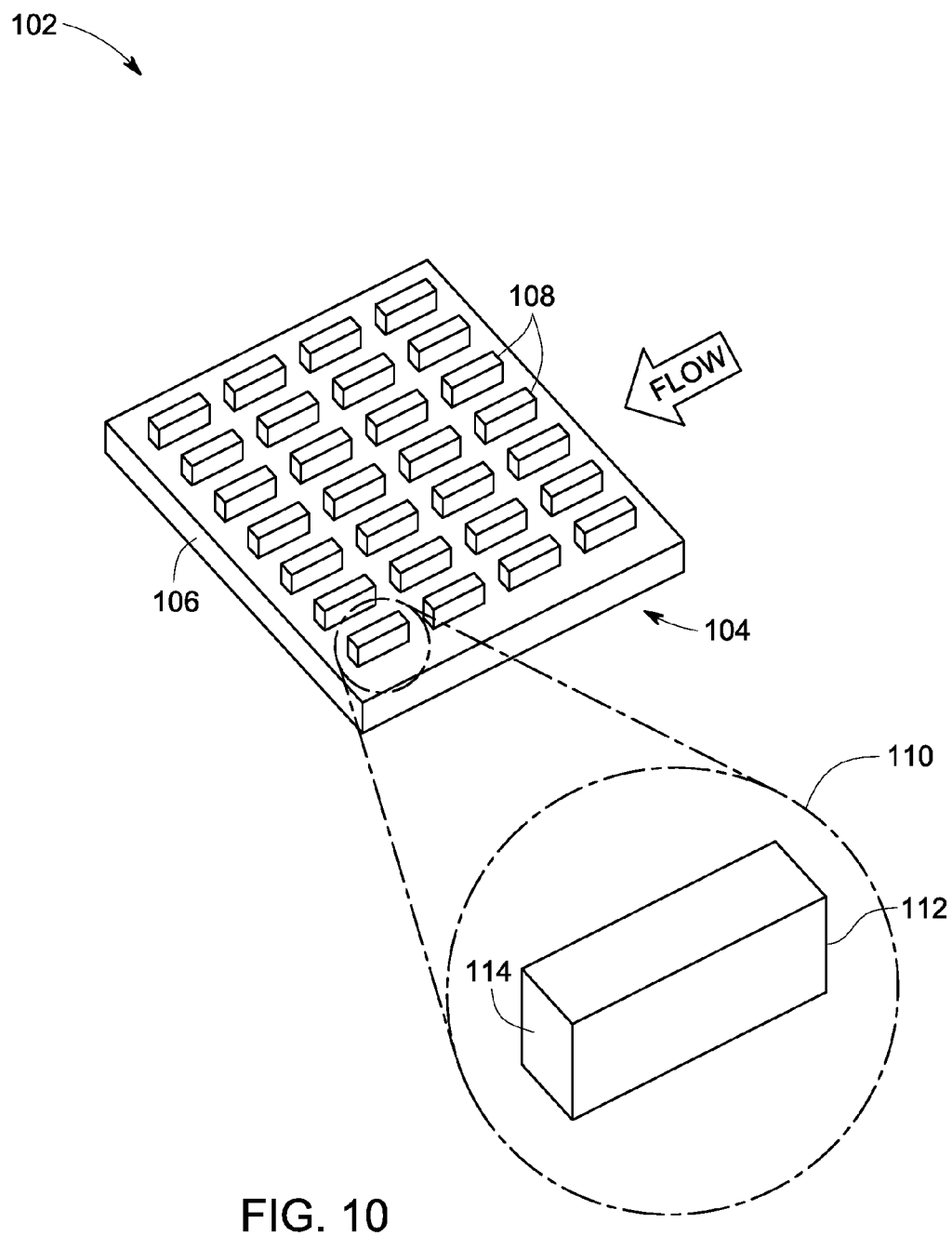
FIG. 10 is a perspective view of a portion of a surface cooler depicting the fins, according to aspects of the present technique.

FIG. 10 illustrates a perspective view 102 of an exemplary surface cooler 104 with a plurality of fins 108 disposed on an inner layer 106. An exploded view 110 of a fin 108 with a first end 112 and a second end 114 is illustrated. As used herein, the term "first end" is a face of the fin 108 on which the airflow impinges, while the term "second end" is a face of the fin 108 that is away from the airflow. As noted hereinabove, the fins 80 (see FIG. 6), 90 (see FIG. 8) are configured to facilitate enhanced heat transfer in addition to providing enhanced acoustic absorption. In accordance with further aspects of the present technique, the heat transfer capability of the fins may be further enhanced, and will be explained in greater detail with reference to FIGS. 11-13.

Figure 11:
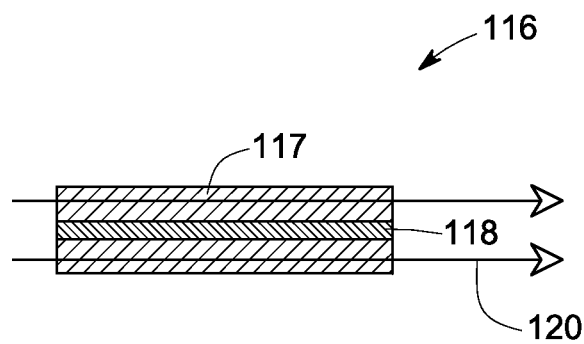
FIG. 11 is a diagrammatical illustration of a top view of an exemplary fin, in accordance with aspects of the present technique.

Turning now to FIG. 11 a top view of an exemplary fin 116, in accordance with aspects of the present technique, is illustrated. The fin 116 may be formed from a metal foam 117. Further, a solid conducting material or a solid metal blade 118 may be disposed in the fin 116 to create an effective conduction path, thereby facilitating transfer of heat from an inner layer of an exemplary surface cooler to the surface of the fin 116. In one embodiment, a solid metal blade 118 may be disposed in the middle of the fin 116. Also, in one embodiment, the solid metal blade 118 may include a material such as, but not limited to, thermal pyrolytic graphite. Further, reference numeral 120 is representative of airflow. It may be noted that in the present example, the airflow 120 is parallel to the fin 116.

Figure 12:
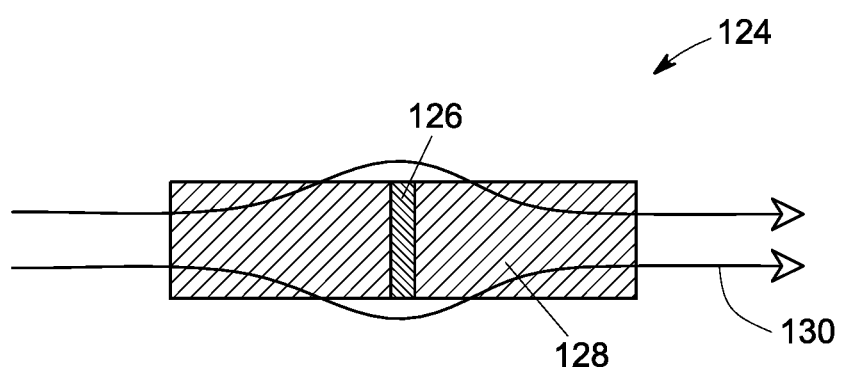
FIG. 12 is a diagrammatical illustration of another exemplary fin, in accordance with aspects of the present technique.

In another embodiment, the solid metal blade 118 of FIG. 11 may be placed perpendicular to the airflow as depicted in FIG. 12. More particularly, FIG. 12 illustrates a top view of another exemplary fin 124 including a solid metal blade 126 disposed in the fin 124 such that the solid metal blade 126 is substantially perpendicular to airflow 130. The perpendicular orientation of the solid metal blade 126 forces the airflow 130 around carbon foam or metal foam 128 of the fin 124

Figure 13:
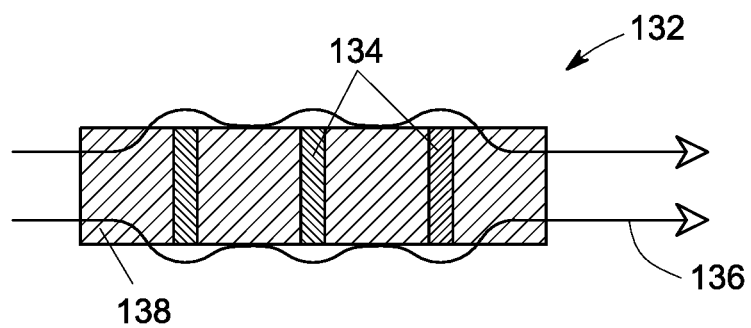
FIG. 13 is a diagrammatical illustration of a top view of another exemplary fin, in accordance with aspects of the present technique.

FIG. 13 illustrates yet another embodiment of a top view of an exemplary fin 132. In this embodiment, a plurality of solid metal blades 134 may be disposed in the exemplary fin 132 such that the blades 134 are perpendicular to the airflow 136. Reference numeral 138 is representative of carbon or metal foam. By including a plurality of blades 134, the fin 132 may be divided into a plurality of sectors. The airflow 136 is forced around the metal foam as depicted to optimize heat transfer as well as aerodynamic performance of the fin.

As previously noted, with respect to FIG. 6, the fins 80 are formed using a metal foam. In certain situations the fins 80 may experience diminished aerodynamic performance due to the porous nature of the foam. Hence it may be desirable to also enhance the aerodynamic performance of these fins.

Figure 14:
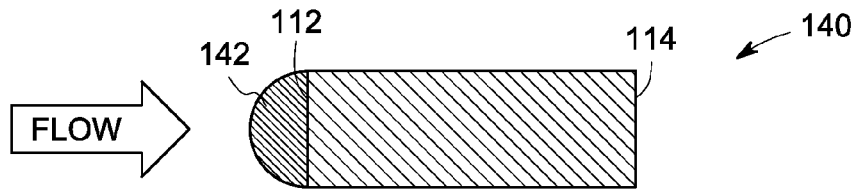
FIG. 14 is a top view of an exemplary fin illustrating a leading edge, according to aspects of the present technique.
Figure 15:
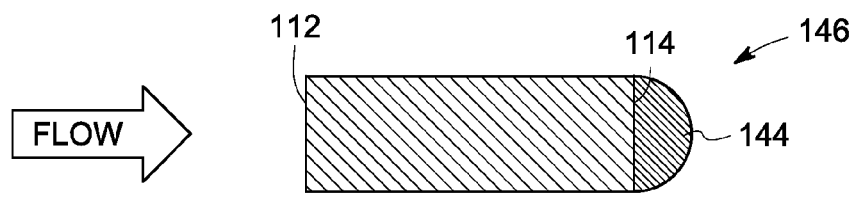
FIG. 15 is a top view of an exemplary fin illustrating a trailing edge, according to aspects of the present technique.
Figure 16:
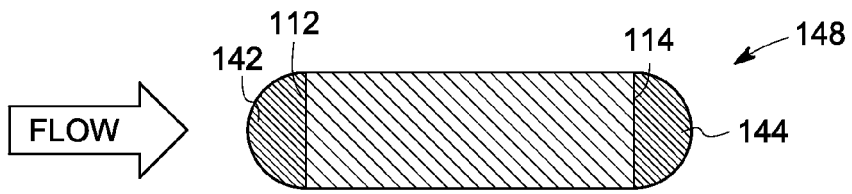
FIG. 16 is a top view of an exemplary fin illustrating a leading edge and a trailing edge according to aspects of the present technique.

Referring now to FIGS. 14-19, top views of alternate structures of the plurality of fins 108 (see FIG. 10) are illustrated. In accordance with exemplary aspects of the present technique, aerodynamic performance of the flow passing the plurality of fins 108 may be enhanced by forming a leading edge, a trailing edge, or a combination thereof on the first end 112 (see FIG. 10) and the second end 114 (see FIG. 10) of the fins 108. According to the embodiments of the present technique, the trailing edge and/or the leading edge may be formed using a solid metal. These solid metal edges may aid in preventing excessive pressure drop, thereby resulting in increased aerodynamic performance of the fins 108. Accordingly, alternate embodiments of the fins 108 are presented. These alternate embodiments may be configured to further enhance the aerodynamic performance of the engine and will be described in greater detail with respect to FIGS. 14-19. FIG. 14 illustrates an exemplary embodiment of a fin 140 configured for enhanced aerodynamic performance. As previously noted, the fin 140 may include a metal foam. Also, as previously noted reference numeral 112 is representative of a first end, while reference numeral 114 is indicative of a second end of the fin 140. As used herein, the term "first end" is representative of an end of the fin 140 on which the airflow in an engine impinges upon, while the term "second end" is representative of an end of the fin 140 that is away from the airflow. As illustrated in FIG. 14, a leading edge 142 may be formed on the first end 112. Alternatively, a trailing edge 144 may be formed on the second end 114 of a fin 146, as illustrated in FIG. 15. It may be noted that the leading edge, the trailing edge, or both, may include solid metal. FIG. 16 illustrates yet another embodiment where a fin 148 includes both the leading edge 142 and the trailing edge 144 disposed on the first end 112 and the second end 114 respectively.

Figure 17:
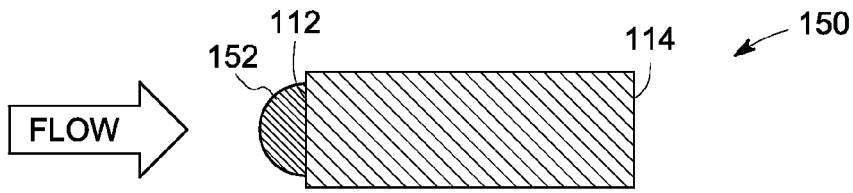
FIG. 17 is a top view of an exemplary fin illustrating a leading edge, according to aspects of the present technique.
Figure 18:
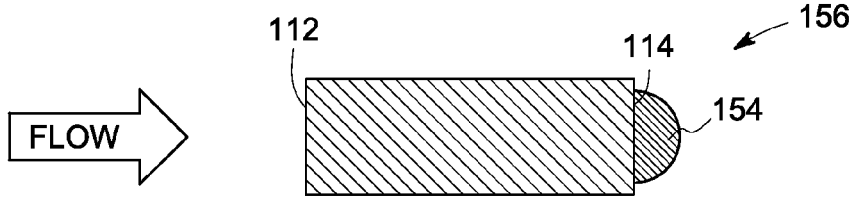
FIG. 18 is a top view of an exemplary fin illustrating a trailing edge, according to aspects of the present technique.
Figure 19:
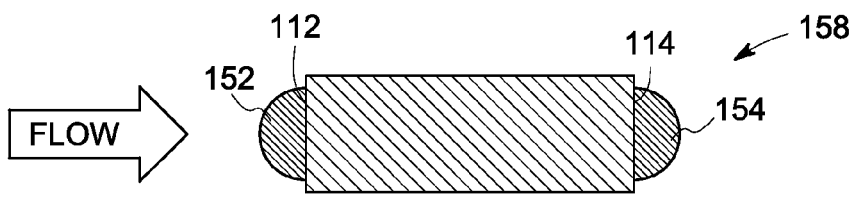
FIG. 19 is a top view of an exemplary fin illustrating a leading edge and a trailing edge according to aspects of the present technique.

Similarly, FIG. 17 illustrates a fin 150 where the first end 112 may be partially covered by a leading edge 152. In another embodiment, the second end 114 of a fin 156 (see FIG. 18) may be partially covered by a trailing edge 154. FIG. 19 illustrates yet another embodiment depicting a top view of a fin 158 with both the first end 112 and the second end 114 partially covered by the leading edge 152 and the trailing edge 154 respectively.

The various embodiments of the exemplary surface cooler described hereinabove provide augmented heat transfer and improved acoustic absorption. Additionally, the exemplary surface cooler reduces the mass of a turbomachine. Further, the exemplary surface coolers may also reduce impact on losses in the bypass flow, thus facilitating better fuel consumption.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A surface cooler comprising:
   an inner layer; and
   an outer layer disposed adjacent to the inner layer and comprising a metal foam, a carbon foam, or a combination thereof, wherein the metal foam, the carbon foam or a combination thereof is configured to augment heat transfer and enhance acoustic absorption, wherein the outer layer comprises a plurality of fins and the plurality of fins comprises a metal foam, a carbon foam, or a combination thereof.

2. The surface cooler of claim 1, further comprising a plurality of tubes disposed in the inner layer, wherein the plurality of tubes are configured to carry fluid to be cooled.

3. The surface cooler of claim 1, wherein the inner layer comprises a solid metal.

4. The surface cooler of claim 1, wherein the inner layer comprises a metal foam, a carbon foam or a combination thereof.

5. The surface cooler of claim 1, further comprising a trailing edge, a leading edge, or a combination thereof, disposed on one or more ends of the plurality of fins.

6. The surface cooler of claim 5, wherein the trailing edge, the leading edge or a combination thereof are configured to cover at least a portion of an edge of the plurality of fins.

7. The surface cooler of claim 5, wherein the trailing edge, the leading edge, or a combination thereof comprise a metal.

8. The surface cooler of claim 1, wherein the outer layer comprise a carbon foam having a thermal conductivity in a range of from 150 W/m·K to 390 W/m·K.

9. The surface cooler of claim 1, wherein the outer layer comprises an aluminum foam having a thermal conductivity of 189 W/m·k.

10. The surface cooler of claim 1, wherein the outer layer has a porosity in a range of 75% to 95% of the volume of the outer layer.

11. The surface cooler of claim 1, wherein the outer layer is a closed-cell foam.

12. The surface cooler of claim 1, wherein the outer layer is an open-celled foam.

13. The surface cooler of claim 1, wherein the outer layer comprises gas-filled pores.

14. A method of forming a surface cooler, comprising:
forming an inner layer;
forming an outer layer adjacent to the inner layer, wherein the outer layer comprises a metal foam, a carbon foam, or a combination thereof, and wherein the metal foam, the carbon foam, or a combination thereof is configured to augment heat transfer and enhance acoustic absorption and machining the outer layer to form a plurality of fins, wherein the fins are configured to augment heat transfer and acoustic absorption.

15. The method of claim 14, further comprising disposing a plurality of tubes in the inner layer, wherein the plurality of tubes are configured to carry fluid to be cooled.

16. The method of claim 14, wherein the inner layer comprises a solid metal.

17. The method of claim 14, wherein the inner layer comprises a metal foam, a carbon foam, or a combination thereof.

18. The method of claim 14, further comprising disposing the surface cooler along an outer wall of a turbomachine.

19. The method according to claim 14, wherein the outer layer has a porosity in a range of 75% to 95% of the volume of the outer layer.

20. The method according to claim 14, wherein the outer layer is an open-celled foam.

21. The method according to claim 14, wherein the outer layer comprises gas-filled pores.

22. An engine comprising:
a core engine; and
a surface cooler according to claim 1.

23. The engine of claim 22, wherein the surface cooler is disposed adjacent to a nacelle wall of the engine.

24. The engine of claim 22, wherein the surface cooler is disposed adjacent to an inner wall of the engine.

* * * * *